H. S. HART, J. O. NEIKIRK & F. W. HAHN.
GONDOLA CAR.
APPLICATION FILED MAR. 14, 1907. RENEWED OCT. 13, 1910.
1,010,625.
Patented Dec. 5, 1911.
6 SHEETS—SHEET 3.
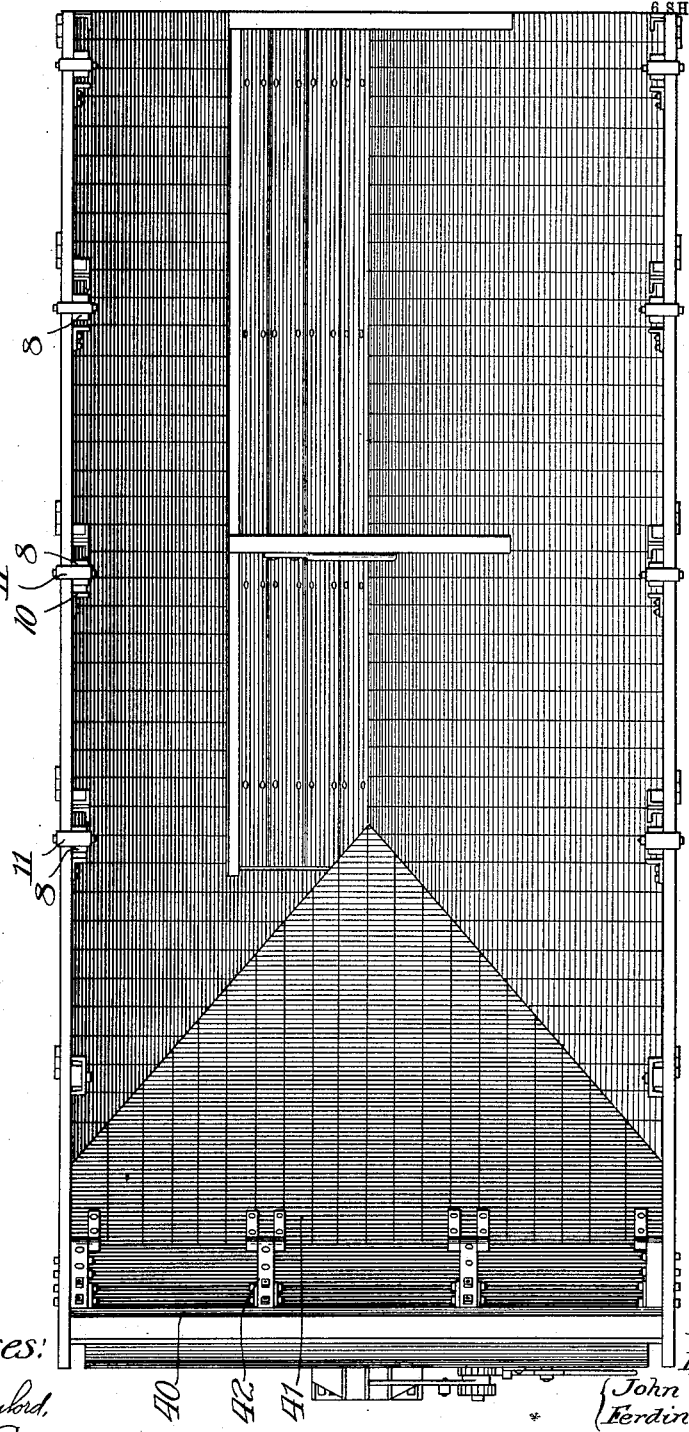

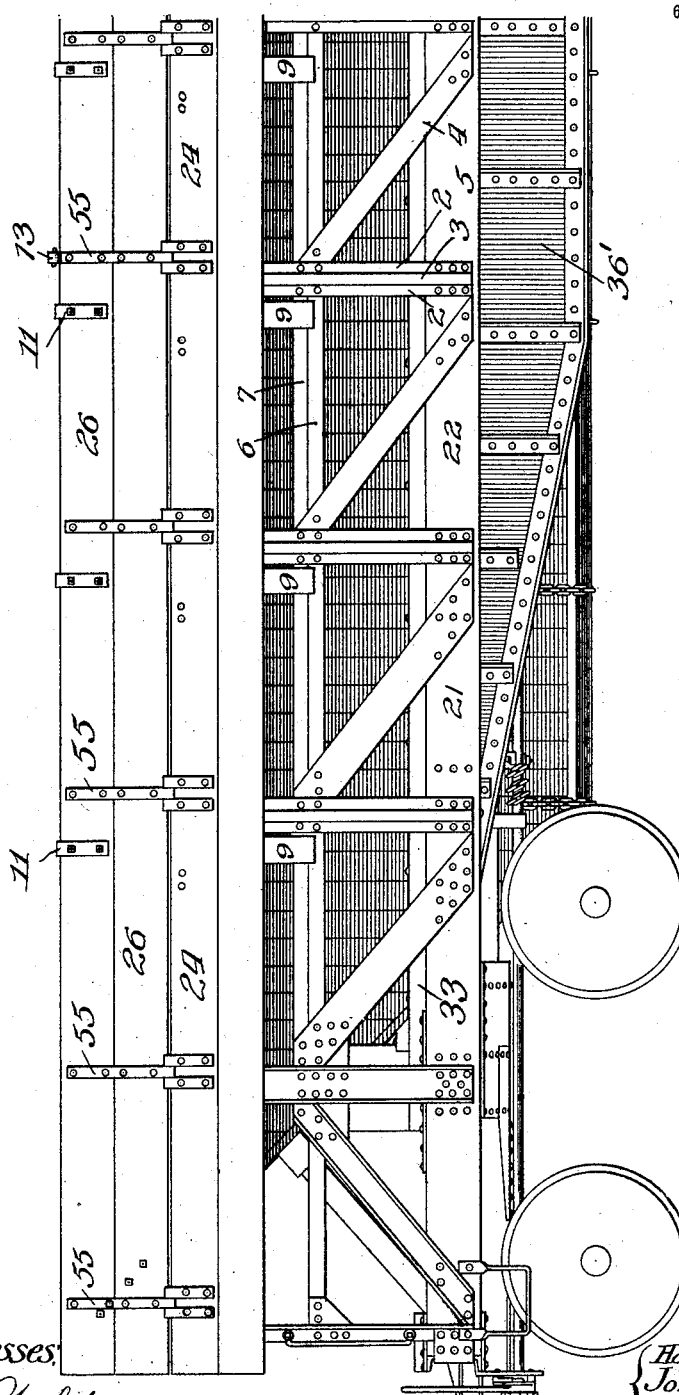

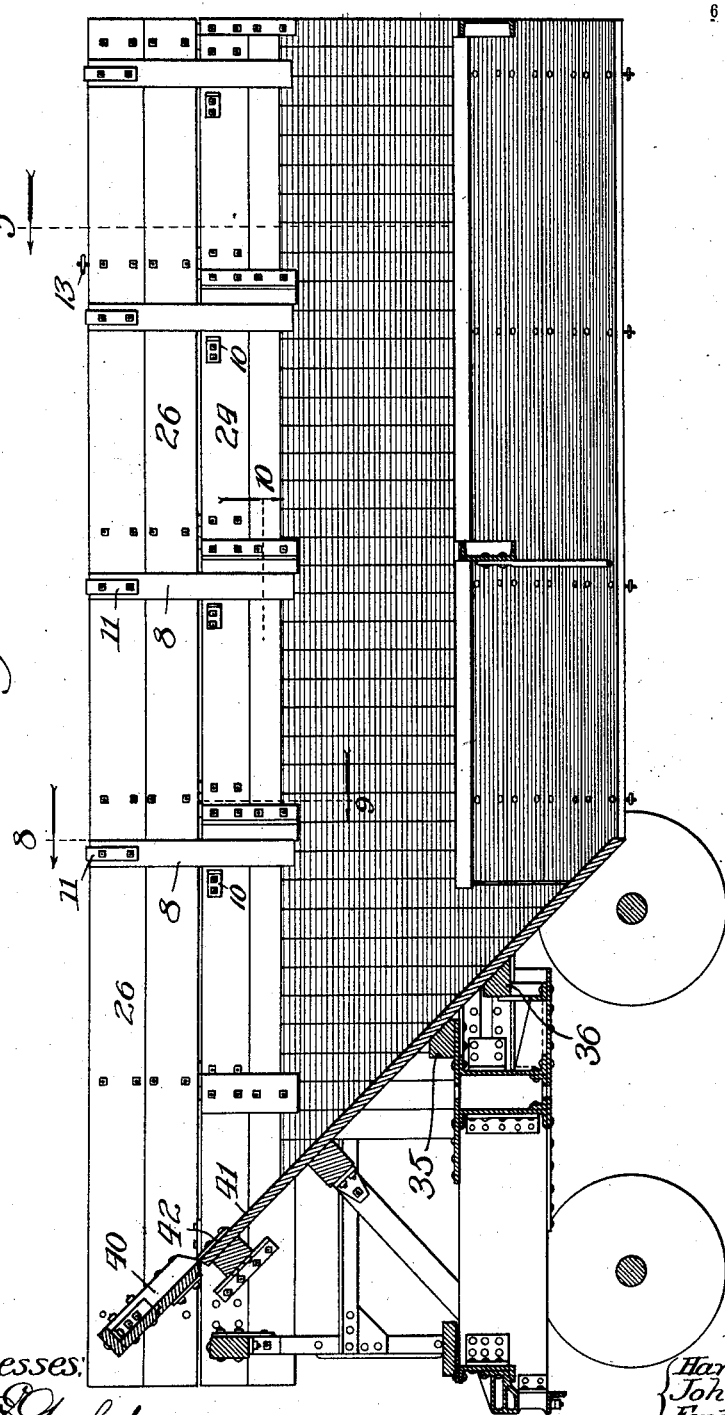

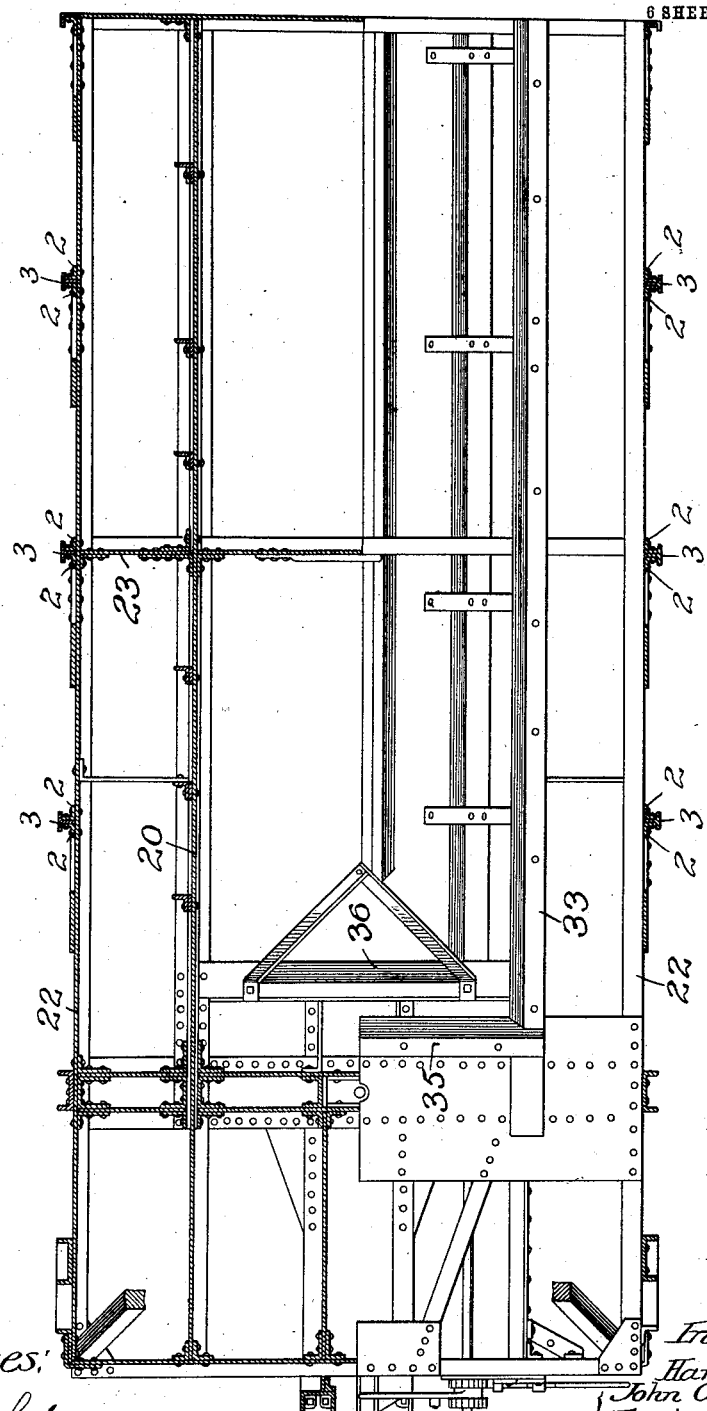

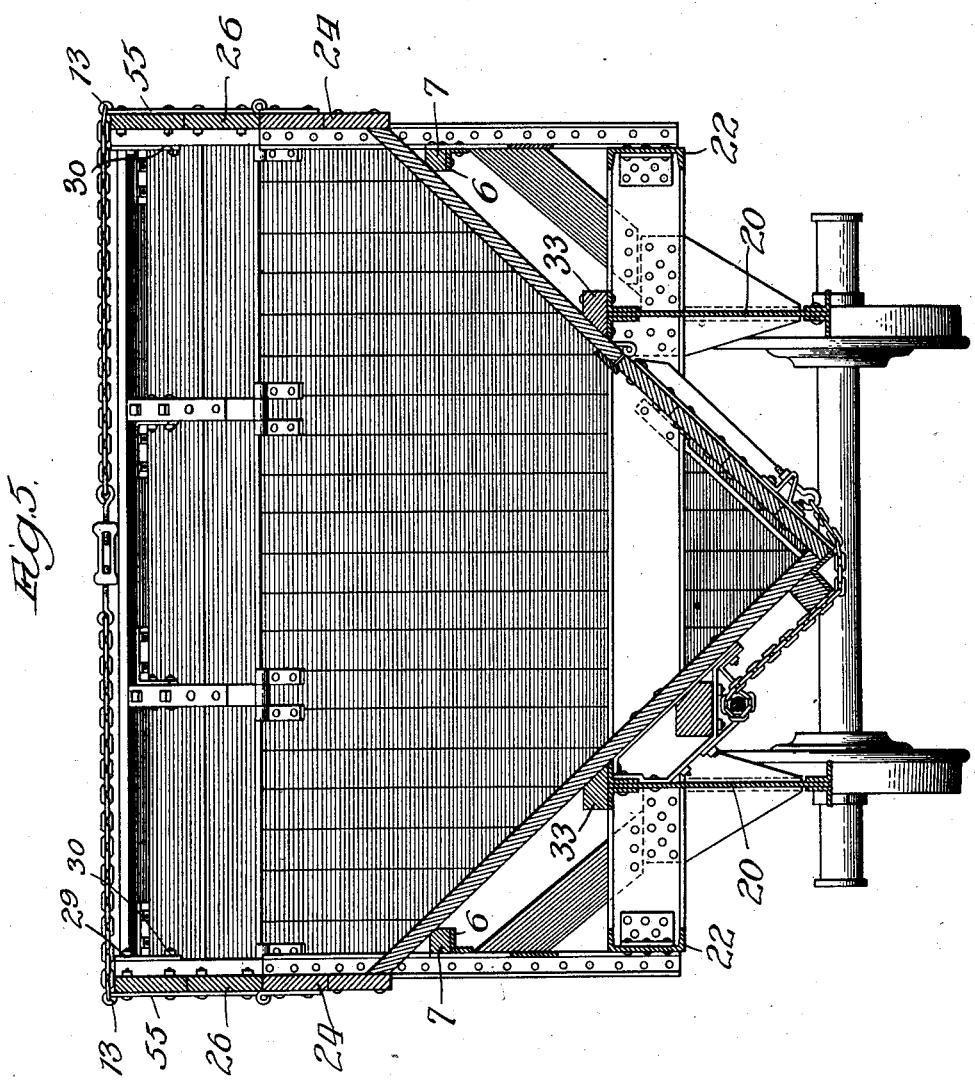

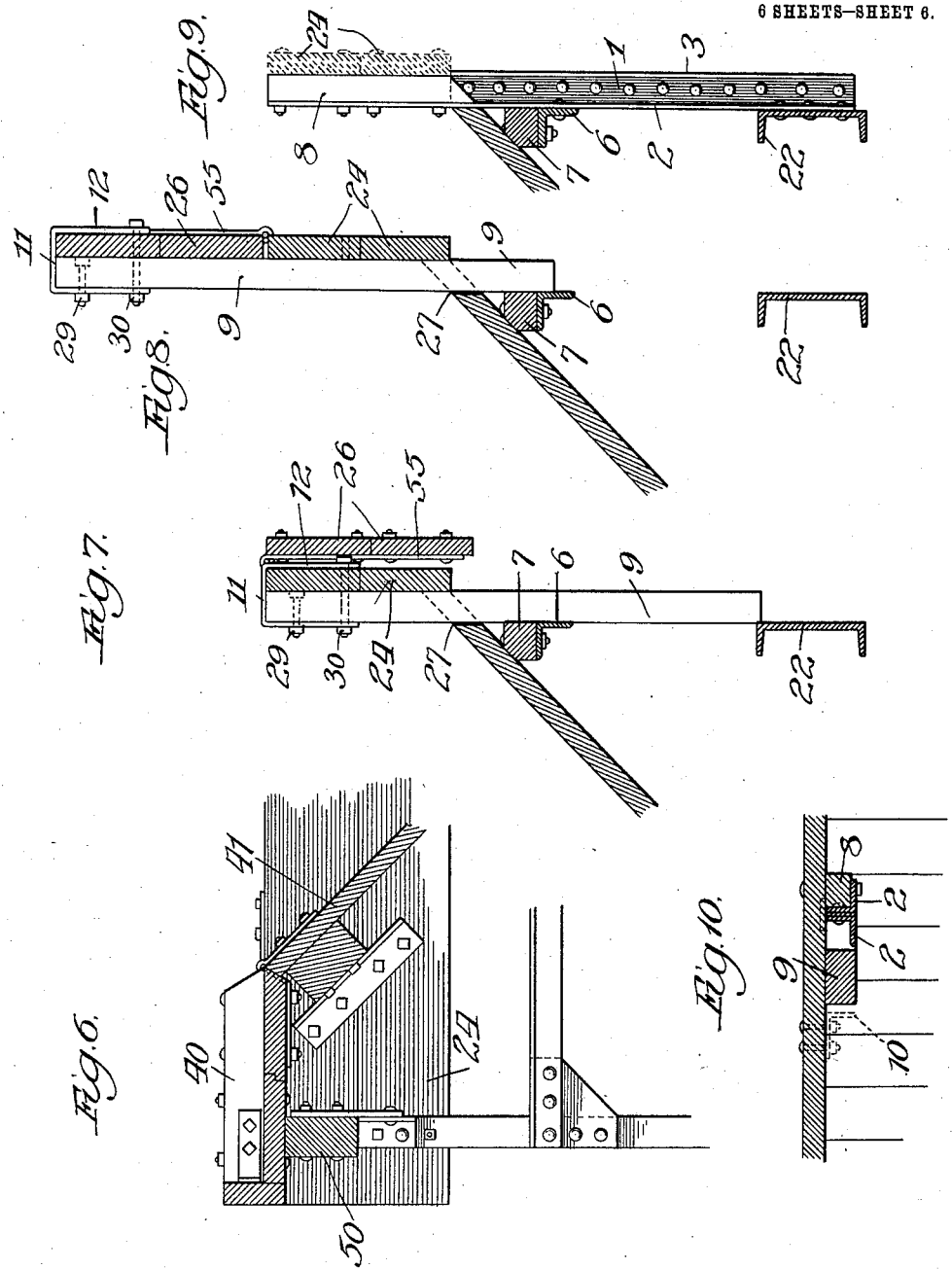

UNITED STATES PATENT OFFICE.

HARRY S. HART, OF CHICAGO, JOHN O. NEIKIRK, OF MORGAN PARK, AND FERDINAND W. HAHN, OF CHICAGO, ILLINOIS, ASSIGNORS TO RODGER BALLAST CAR COMPANY, OF CHICAGO, ILLINOIS, A CORPORATION OF MAINE.

GONDOLA CAR.

1,010,625. Specification of Letters Patent. Patented Dec. 5, 1911.

Application filed March 14, 1907, Serial No. 362,302. Renewed October 13, 1910. Serial No. 586,940.

*To all whom it may concern:*

Be it known that we, HARRY S. HART, of Chicago, in the county of Cook and State of Illinois, JOHN O. NEIKIRK, of Morgan Park, in the county of Cook and State of Illinois, and FERDINAND W. HAHN, of Chicago, in the county of Cook and State of Illinois, citizens of the United States, have invented certain new and useful Improvements in Gondola Cars, of which the following is a specification.

The object of our invention is to provide an improved underframe especially adapted for use in connection with gondola cars provided with a hopper bottom but also applicable for use in connection with cars of other types.

A further object of our invention is to provide new and improved means for adjusting the height of the sides and ends of gondola cars. This latter improvement is illustrated in connection with a car provided with a hopper bottom but is equally available for use in connection with cars of other types.

In the drawings—Figure 1 is a side elevation of a part of a car constructed in accordance with our invention. Fig. 2 is a longitudinal sectional elevation of part of the car shown in Fig. 1. Fig. 3 is a plan view of part of our improved car. Fig. 4 is a plan view partly in section of the underframe of the car. Fig. 5 is a transverse sectional elevation of the car. Fig. 6 is a sectional view showing the construction of the extension end of the car. Figs. 7 to 10 are detail sectional views showing the construction of the extension sides and of the sliding stakes provided for their support.

Our improved car is supported longitudinally by means of sills 20 of the plate girder type occupying a position between the center of the car and the sides. In the construction illustrated no center sill is employed, thus affording space at the center of the car for the lower part of the hopper bottom and permitting the free discharge of the contents of the hopper through the door provided for that purpose. The side sills of the car consist of trusses designated generally as 21. These trusses consist of longitudinal channel irons 22 at the level of and secured to the transverse members 23 of the underframe. Each of the vertical members of the side trusses consists of a pair of angle irons 2 between the flanges of which is received a T-iron 3. The angle irons and T-irons are secured together by rivets and the flanges of the angle irons are also secured to the horizontal and diagonal members to the trusses by rivets. The T-irons 3 terminate at the lower edge of the lowest side plank 24 of the car side, as indicated by the dotted line in Fig. 9 of the drawings, but the angle irons 2 are continued to the upper edge of the rigid part of the car side, which rigid part comprises, in the present instance, the planks 24, 24. For the purpose of better securing the angle irons to the planks 24, 24 a filler 8 shown in Fig. 10 of the drawings is inserted beneath one of said angle irons, and the rivets by which the angle irons are secured to the side of the car pass through said filler.

The upper part 26 of the side is attached to the lower part by means of hinges 55, thus permitting the upper part to assume either the position shown in Fig. 7 or that shown in Fig. 8. For the purpose of securing the part 26 in its elevated position we have provided sliding stakes 9 which pass through apertures 27 in the bottom of the car and are guided in their movement by angles 10 secured to the car side and by the angle irons 2 of the side truss. Metal strips 11 bent into the form of hooks are secured by means of bolts 29 to the stakes. The outer part 12 of the hooks 11 is spaced from the inner part sufficiently to embrace either the stationary part 24 or the movable part 26 of the car side, as illustrated in Figs. 7 and 8. When the extension side 26 is lowered to the position shown in Fig. 7, the stake 9 is allowed to slide down through the aperture 27 in the floor of the car, the part 12 of the hook 11 entering the space between the parts 24 and 26 of the side. The hook 11 thus serves to limit the downward movement of the stake 9. The extension side 26 when in its elevated position, shown in Fig. 8, is secured by the hook 11. The stake 9 has sufficient vertical movement to assume either the position shown in Fig. 7 or that shown in Fig. 8. For the purpose of securing the stake and hook 11 either to the stationary part 24 of the car side or to the part 26 when the latter is elevated, a bolt 30 passing through the stake, the strap 11 and the car side may be employed.

The hopper bottom of the car is supported at its outer sides upon the longitudinal beams 7 which rest upon angle irons 6 forming part of the side trusses. The sides are also supported at about their centers upon the longitudinal beams 33 which rest upon the upper edges of the plate girders 20. The ends of the hopper bottom rest upon transverse beams 35 and 36 the former being supported upon the bolsters and the latter upon the intermediate plate girders. The intermediate plate girders are continuous from end to end of the car and are of greater depth at the center and taper toward the ends, as shown in Fig. 1. In the present instance we have shown these plate girders as consisting of main webs 36' reinforced at the top and bottom by longitudinal angle irons and by vertical angle irons.

The upper part 40 of the ends of the car is attached to the lower part by means of hinges 42. When in its lowered position the part 40 rests upon the transverse beam 50, and when elevated is bolted to the extension sides 26.

In order to more securely support the hinged side sections 26 in upright position we provide an adjustable connection extending across the car and connected to the opposite hinged sections. In Fig. 5 this adjustable connection is shown as a chain provided with a turnbuckle.

We claim:

1. A dump car comprising a longitudinal hopper bottom sloping upward to the sides of the car, plate girders forming longitudinal sills intermediate the center and sides of the car, and trussed side sills, the sides of said hopper resting on said intermediate and side sills.

2. A hopper bottom car comprising downwardly and inwardly sloping sides and ends, trussed side sills, intermediate longitudinal sills of the plate girder type, transverse supports for the ends of the hopper, said transverse supports extending between and resting upon said intermediate sills, and the sides of the hopper being supported upon said intermediate and said side sills.

3. In a car of the class described, an underframe comprising bolsters, separate longitudinal plate girder sills intermediate the center and sides of the car, side sills, transverse members extending to the car sides and secured to said intermediate and side sills, said intermediate sills being of greater depth than the remainder of the underframe and extending downward beyond the same, and a car bottom supported upon said intermediate and side sills.

4. A car comprising sides having a lower fixed part and an upper hinged part, fixed stakes for said lower part, and movable stakes for said hinged part.

5. A car comprising sides having a lower fixed part and an upper hinged part, fixed stakes for said lower part and vertically movable stakes for the said hinged part.

6. A hopper bottom car comprising sides having lower fixed parts and upper hinged parts, fixed stakes for said lower parts, and movable stakes for said hinged parts.

7. A hopper bottom car comprising sides having lower fixed parts and upper hinged parts, fixed stakes for said lower parts and vertically movable stakes for said hinged parts.

8. A car having a rigid side portion and a movable side portion hinged thereto, the rigid part being supported by uprights forming part of the side sills, and movable stakes provided with means for holding the hinged parts of the side in an upright position.

9. A car having a rigid side portion, and a movable side portion hinged thereto, the rigid part being supported by uprights forming part of the side sills, and sliding stakes provided with means for holding the hinged parts of the side in an upright position.

10. A car having an upper side portion hinged to the lower part of the side, fixed stakes terminating adjacent the upper edge of the lower part of the side, a vertically movable stake, guides therefor, a hook at the top of said stake for securing said hinged part of the side in an upright position.

11. A car having an upper side portion hinged to the lower part of the side, a movable stake, guides therefor, a hook at the top of said stake, and means for securing said hook to the hinged part of the side or to the stationary part of the side.

12. A car having an upper side portion hinged to the lower part of the side, a vertically movable stake, guides therefor, a hook at the top of said stake and means for securing said hook to the hinged part of the side, or to the stationary part of the side.

13. A car having an upper side portion hinged to the lower part of the side, vertically movable stakes, hooks upon said stakes adapted to engage the hinged side portion when in raised position, and to occupy the space between the lower side portion and the hinged portion when the latter is lowered.

14. A car having ends and sides the upper portions of which are hinged to the lower portions, means for supporting the upper side portions in an upright position, and means for securing the end hinged portions to the side hinged portions when said parts are in their elevated positions.

15. A car having ends and sides, the upper portions of which may be adjusted to form a continuation of the lower portions or may be lowered for the purpose of reducing the height of said sides and ends, in combination with fixed stakes for the lower portions and sliding stakes for the upper portions.

16. A car provided with sides having folding upper parts, vertically movable stakes having hooks serving to hold said upper parts in position when elevated and also serving to retain the stakes in position when said stakes are lowered.

17. A car having rigid side portions and movable side portions hinged thereto, movable stakes for said movable side portions, and means extending across the car for holding said hinged portions in upright position.

18. A car having rigid side portions and movable side portions hinged thereto, sliding stakes for said movable side portions, and means extending across the car for holding said hinged portions in upright position.

19. A car having rigid side portions and movable side portions hinged thereto, sliding stakes for said movable side portions, and a member extending across the car and provided with adjusting means for holding said hinged portions in upright position.

20. A car having rigid side portions and movable side portions hinged thereto, sliding stakes for said movable side portions, and a member extending across the car and provided with a turnbuckle for holding said hinged portions in upright position.

21. A car having rigid side portions and movable side portions hinged thereto, sliding stakes for said movable side portions, and a chain extending across the car and provided with a turnbuckle for holding said hinged portions in upright position.

HARRY S. HART.
JOHN O. NEIKIRK.
FERDINAND W. HAHN.

Witnesses to the signature of Harry S. Hart:
 WM. McAULIFFE,
 E. S. HART.

Witnesses to the signatures of John O. Neikirk and Ferdinand W. Hahn:
 JOHN M. SNEAD,
 RONALD R. ROBINSON.

---

Copies of this patent may be obtained for five cents each, by addressing the "Commissioner of Patents, Washington, D. C."